(12) United States Patent
Striemer

(10) Patent No.: US 7,079,808 B2
(45) Date of Patent: Jul. 18, 2006

(54) LIGHT SOCKET WIRELESS REPEATER AND CONTROLLER

(75) Inventor: Bryan Lester Striemer, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 10/125,191

(22) Filed: Apr. 18, 2002

(65) Prior Publication Data

US 2003/0199247 A1   Oct. 23, 2003

(51) Int. Cl.
*H04B 3/36* (2006.01)

(52) U.S. Cl. .................. 455/7; 455/9; 455/10; 455/16; 455/19; 370/315

(58) Field of Classification Search .............. 455/7–10, 455/11.1, 14–25, 402; 370/315
See application file for complete search history.

(56) References Cited

U.S. PATENT DOCUMENTS

| 4,570,216 A | * | 2/1986 | Chan ........................... 700/14 |
| 5,426,690 A | * | 6/1995 | Hikuma et al. .............. 455/411 |
| 5,881,095 A | * | 3/1999 | Cadd ........................... 375/132 |
| 6,347,236 B1 | * | 2/2002 | Gibbons et al. ............. 455/574 |
| 6,400,968 B1 | * | 6/2002 | White et al. ................. 455/572 |
| 2002/0028655 A1 | * | 3/2002 | Rosener et al. ............... 455/16 |

* cited by examiner

*Primary Examiner*—Edward F. Urban
*Assistant Examiner*—Raymond Dean
(74) *Attorney, Agent, or Firm*—Martin & Associates, LLC; Derek P. Martin

(57) ABSTRACT

A wireless repeater and controller is placed between a light socket and a light bulb, such as in a ceiling light fixture. The wireless repeater and controller has an extending threaded portion that screws into the light socket, and a recessed threaded portion that receives a light bulb. When the light switch that would normally control the light bulb is on, power is provided to the wireless repeater and controller. When the power to the wireless repeater and controller is toggled on then off using the light switch, the wireless repeater and controller disconnects line power from the light bulb so the light switch can still be used to control the light bulb.

30 Claims, 5 Drawing Sheets

LIGHT SOCKET WIRELESS REPEATER AND CONTROLLER

BACKGROUND OF THE INVENTION

1. Technical Field

This invention generally relates to wireless communications, and more specifically relates to the repeating of wireless transmissions.

2. Background Art

Wireless communications between electronic devices are becoming more common. One factor in the proliferation of wireless communication is the definition of a standard known as Bluetooth that specifies how wireless devices within a relatively short distance of each other can intercommunicate. Another standard known in the industry is IEEE 802.11, which is a higher data rate standard that has a longer range than Bluetooth. IEEE 802.11 has been called "wireless ethernet" because its data rates and range allows coupling many different computers together without cabling.

One problem that arises in some situations is that a wireless radio may not have the range to interconnect all of the components that need to be interconnected. For example, in a relatively large office building, a transceiver at one end of the building may not have sufficient range to communicate with a transceiver at the opposite end of the building. As a result, wireless repeaters have been developed. Known wireless repeaters are hard-wired to a power line, which requires a new electrical line or cord to be run. These repeaters are typically mounted high on a side wall. Because they are hard-wired, a power cord or line must be run to the device. When these repeaters are installed as an upgrade (i.e., not during the construction of the building), the wires are ofttimes run along the wall, making the wires very visible and unattractive. In addition, when these repeaters are installed close to metal objects, such as a metal stud wall, a metal roof, a metal desk, a metal filing cabinet, etc. the effective range of the repeaters may be adversely affected. Without a way to quickly and easily install wireless repeaters without hard-wiring in more convenient locations, the wireless industry will continue to suffer from inefficient and unattractive ways of extending the range of a wireless device.

DISCLOSURE OF INVENTION

According to the preferred embodiments, a wireless repeater and controller is placed between a light socket and a light bulb, such as in a ceiling light fixture. The wireless repeater and controller has an extending threaded portion that screws into the light socket, and a recessed threaded portion that receives a light bulb. In this manner a wireless repeater may be installed very quickly without tools in any location where there is a lightbulb. When the light switch that would normally control the light bulb is on, power is provided to the wireless repeater and controller. When the wireless repeater and controller receives a wireless message, it repeats the wireless message at a predetermined power level. When the wireless repeater and controller receives a wireless command message to turn the light on, the wireless repeater and controller connects line power to the light bulb. When the wireless repeater and controller receives a wireless command message to turn the light off, the wireless repeater and controller disconnects line power from the light bulb. Installing the wireless repeater and controller results in significant advantages, including the repeating of wireless messages, and the ability to control the light via wireless commands.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Overview

Figure 1:
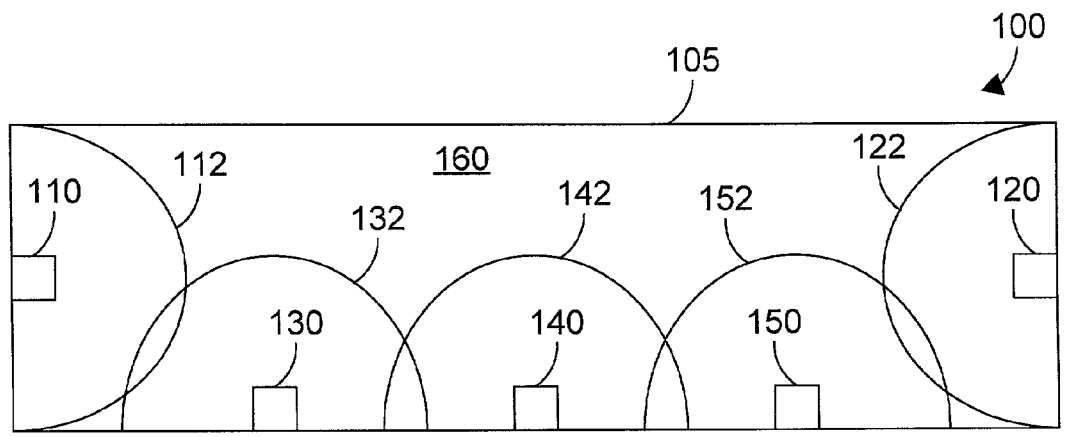
FIG. 1 is a schematic block diagram showing the use of wireless repeaters that are hard-wired to a power supply, as known in the prior art.

The preferred embodiments relate to wireless communications to electronic devices using a local wireless interface, such as Bluetooth or IEEE 802.11. To understand the context of the invention, a general discussion of two standards for wireless communication are provided below.

Bluetooth

Bluetooth wireless technology is a worldwide specification for a small-form factor, low-cost radio solution that provides links between mobile computers, mobile phones, other portable handheld devices, and connectivity to the Internet. The specification is developed, published and promoted by the Bluetooth Special Interest Group (SIG). The Bluetooth Special Interest Group (SIG) is a trade association comprised of leaders in the telecommunications, computing, and network industries, and is driving development of the technology and bringing it to market. The Bluetooth SIG promoters include IBM, 3Com, Agere, Ericsson, Intel, Microsoft, Motorola, Nokia and Toshiba, and hundreds of associate and adopter member companies.

Bluetooth wireless technology is unique in its breadth of applications. Links can be established between groups of products simultaneously or between individual products and the Internet. While point-to-point connections are supported, the specification allows up to seven simultaneous connections to be established and maintained by a single radio. This flexibility, combined with strict interoperability requirements, has led to support for Bluetooth wireless technology from a wide range of market segments, including software developers, silicon vendors, peripheral and camera manufacturers, mobile PC manufacturers and handheld device developers, consumer electronics manufacturers, car manufacturers, and test and measurement equipment manufacturers.

Hardware that complies with the Bluetooth wireless specification ensures communication compatibility worldwide. Bluetooth is generally designed to operate in a maximum range of one to one hundred meters, depending on the class of the device. Class 1 devices typically transmit in the 1 milliwatt (mW) to 100 mW range, resulting in a range up to 100 meters. Class 2 devices typically transmit in the 250 microwatt (uW) to 2.5 mW range, resulting in a range up to ten meters. Class 3 devices typically transmit less than 250 uW, resulting in a range up to 1 meter. As a low-cost, low-power solution with industry-wide support, Bluetooth wireless technology allows effortlessly interconnecting with compatible devices all over the world.

Devices enabled with Bluetooth wireless technology will be able to: free electronic accessories and peripherals from wired connections; exchange files, business cards, and calendar appointments; transfer and synchronize data wirelessly; take advantage of localized content services in public areas; and function as remote controls, keys, tickets and e-cash wallets.

Many manufacturers of electronic devices are planning to integrate Bluetooth into their devices so their devices can automatically connect to other devices that have a Bluetooth interface within a short range. One goal of Bluetooth is to interconnect many electronic devices without using hard-wire cables. For example, a computer network that includes four computer systems, four monitors, a printer, and a scanner could theoretically be all interconnected via Bluetooth without using any cables to interconnect these items.

Bluetooth includes the capability of identifying each type of device as it establishes a link to other devices. Thus, a printer that has a Bluetooth interface will identify itself as a printer, which makes the print function available to other devices that are linked via Bluetooth to the printer. A mobile phone that includes a Bluetooth interface could automatically detect when it comes in range of a printer that has a Bluetooth interface, and in response to detecting the printer the mobile phone could provide an option to print e-mail or other text information received by the mobile phone, which would send the e-mail or other information to the printer. Details regarding Bluetooth and it's detailed specification may be found on the internet on the Bluetooth website.

Unlike many other wireless standards, the Bluetooth wireless specification includes both link layer and application layer definitions for product developers. Radios that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/sec. The signal hops among 79 frequencies at 1 MHz intervals to give a high degree of interference immunity.

The 2.4 GHz band used by Bluetooth is unlicensed, and can be used by many other types of devices such as cordless phones, microwave ovens, and baby monitors. Any device designed for use in an unlicensed band should be designed for robustness in the presence of interference, and the Bluetooth wireless technology has many features that provide such robustness.

Products that incorporate a Bluetooth interface are already on the market. Nokia Corp. is selling its Bluetooth 6310 phones in Europe, and are expected to be available in the United States sometime in 2002. Broadcom Corp. and handheld PC maker Palm Inc. plan to co-develop a new Bluetooth handheld PC design.

IEEE 802.11

There are other wireless standards that exist besides Bluetooth. For example, Wi-Fi (IEEE 802.11b) is designed to provide wireless Ethernet connectivity that can extend or replace wired networks for dozens of computing devices. Wi-Fi is a trademark of WECA (the Wireless Ethernet Compatibility Alliance). The Bluetooth wireless technology is expected to be used widely as a cable replacement for devices such as PDAs, cell phones, cameras, speakers, headsets and so on. IEEE 802.11 will likely still be used for higher speed wireless Ethernet access, so it is widely expected that Bluetooth and 802.11 will co-exist. Preliminary tests by the Pennsylvania State University's Applied Research Laboratory show that Bluetooth and 802.11b (Wi-Fi) do not interfere with each other even in close proximity. IEEE 802.11 (b)'s typical 284-foot range was unaffected by the presence of Bluetooth devices, while Bluetooth's typical 64-foot range was unaffected by the presence of 802.11 (b) devices.

DETAILED DESCRIPTION

An example of a prior art system for wireless communications is shown in FIG. 1. We assume that a rectangular building 105 includes a first wireless device 110 that needs to communicate with a second wireless device 120. A line 112 indicates the effective range of device 110, while a line 122 indicates the effective range of device 120. These devices 110 and 120 are too far apart to allow them to communicate directly with each other, so repeaters (e.g., 130, 140 and 150) are installed that repeat a wireless message at a predetermined power level. The "predetermined power level" is preferably a maximum power level to allow effectively "boosting" the power of low-power messages. Note that repeaters 130, 140 and 150 are assumed to have respective ranges indicated by 132, 142 and 152 shown in FIG. 1. When device 110 has a message to send to device 120, it transmits the message, which is received by repeater 130, and re-transmitted at a predetermined power level. This re-transmitted message is then received by repeater 140, which re-transmits this message at a predetermined power level. The re-transmitted message from repeater 140 is received by repeater 150, which re-transmits the message at a predetermined power level. The re-transmitted message from repeater 150 is then received by device 120, which can then act in accordance with the received message.

When prior art repeaters, such as repeaters 130, 140 and 150 in FIG. 1, are installed in an existing building, they are typically mounted high on a wall, with an electrical wire run along the wall to supply power to each repeater. The electrical wire can be plugged into a wall receptacle, if one is readily available. In the alternative, an electrical wire could be run from a distribution panel, a junction box, or an existing source of nearby electrical power (such as an outlet), but each of these options require an electrician to perform the installation. Whether the power is supplied by a plug-in cord or a hard-wired electrical line, the result is a visible wire that supplies power to the repeater.

Another problem with prior art repeaters is that their range can be adversely affected by nearby metal objects. Thus, if a building has a metal stud wall or a metal roof, the range of the repeater may be reduced. In addition, if the repeater is placed next to metal filing cabinets or metal desks, the range of the repeater may also be reduced. Furthermore, as shown in FIG. 1, locating a repeater against an exterior wall may result in large areas that are not covered by the repeater, thereby requiring additional repeaters to be installed. This is shown visually in FIG. 1 by the area 160 of building 105 that is not within range of any of the wireless devices or repeaters.

The preferred embodiments provide a vast improvement over hard-wired wireless repeaters by providing a light socket wireless repeater and controller. The wireless repeater and controller includes a stem that may be screwed into a typical light socket, and a socket that receives a light bulb. The wireless repeater and controller is thus installed by placing it between a light bulb and a light socket. The wireless repeater and controller receives its primary operating power from power coming to the light socket. This allows the wireless repeater of the preferred embodiments to be quickly installed without running a separate wire to power the repeater.

Figure 2:
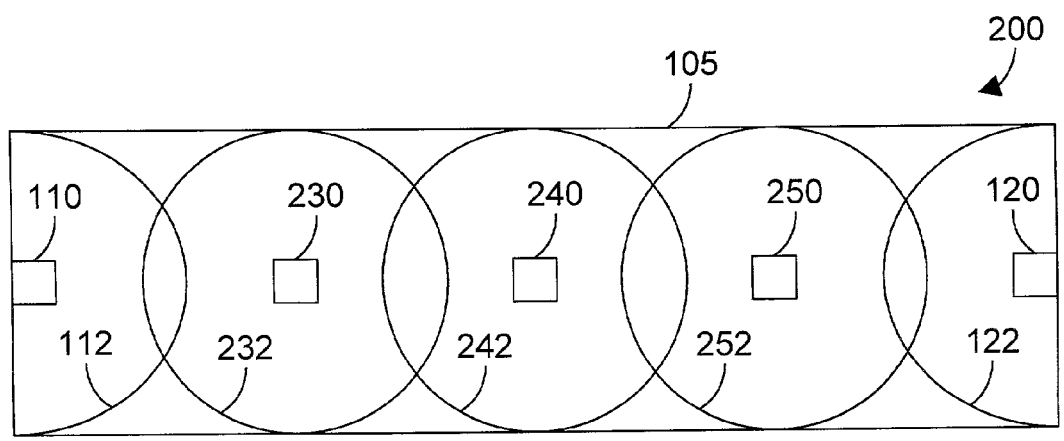
FIG. 2 is a schematic block diagram showing the use of light socket wireless repeaters and controllers in accordance with the preferred embodiments.

Another significant advantage of the light socket wireless repeater and controller of the preferred embodiments is that it can be easily placed at any location that has a light socket. Most light sockets in most buildings are located on the ceiling. By installing the wireless repeater and controller near the ceiling, the potential for interference by nearby metal objects is minimized. In addition, the repeater may be placed in the middle of a room instead of mounted on a wall. The result is that greater coverage with fewer repeaters may be possible. This is shown graphically in FIG. 2. We assume that repeaters 230, 240 and 250 are light socket wireless repeaters and controllers in accordance with the preferred embodiments. Each has a respective range 232, 242 and 252 that sequentially overlap, as shown in FIG. 2. Because the repeaters 230, 240 and 250 may be installed where existing light sockets are located, they may be installed in the middle of a room or building, as shown in FIG. 2. As a result, the square footage of the building 105 that is not covered by the wireless devices 110 and 120 and the wireless repeaters 230, 240 and 250 is very small compared to area 160 shown in FIG. 1. Of course, the power level of the repeaters 230, 240 and 250 could be increased, or the number of repeaters could be increased to achieve complete coverage for all of building 105.

Yet another significant advantage of the light socket wireless repeater and controller is that it includes the ability to turn its lightbulb on and off via wireless commands. When a first command is received to turn on the lightbulb, the wireless repeater and controller applies power to the lightbulb. When a second command is received to turn off the lightbulb, the wireless repeater and controller disconnects power from the lightbulb. In this manner the light socket wireless repeater and transmitter can be used to remotely control the light bulb at the location of a light socket.

Figure 3:
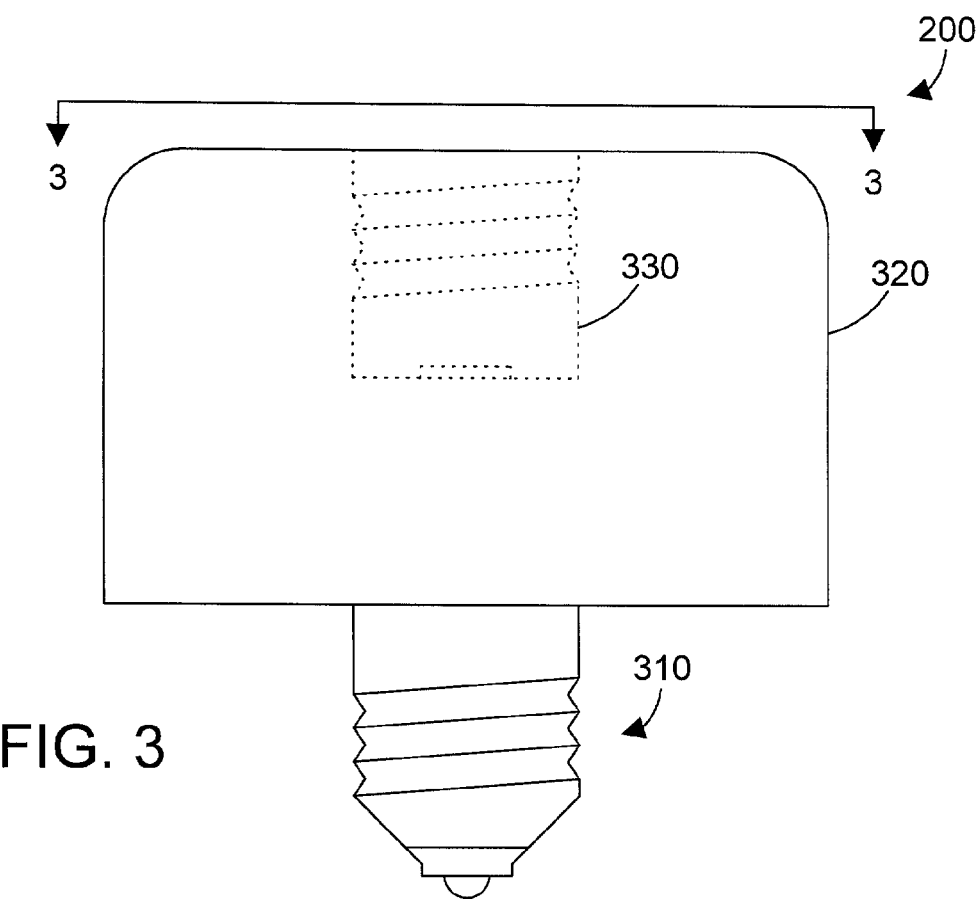
FIG. 3 is a side view of one suitable physical package for a light socket wireless repeater and controller in accordance with the preferred embodiments.
Figure 4:
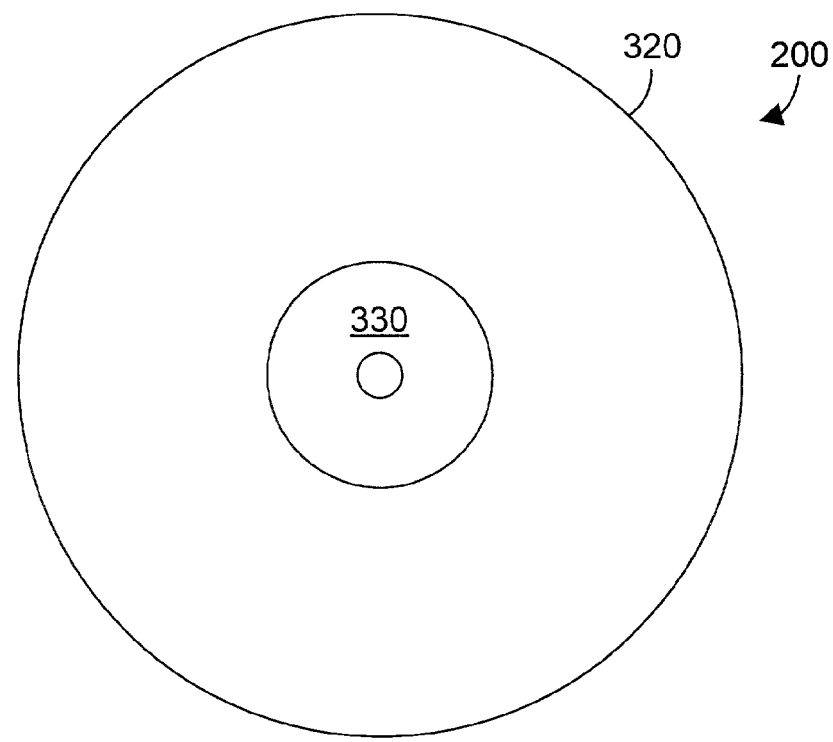
FIG. 4 is a top view of the physical package for the light socket wireless repeater and controller shown in FIG. 2 taken along the line 3—3.

Referring to FIGS. 3 and 4, one specific implementation of a light socket wireless repeater and controller 200 includes a first connection mechanism 310 that preferably has the same shape and size of a lightbulb in a light socket. First connection mechanism 310 is coupled to a main housing 320 that includes a receptacle 330 for receiving a light bulb. Note that the exact type of bulb and its associated means of connection are not limiting of the invention, The preferred embodiments expressly extend to any and all light bulb and socket configurations. In FIGS. 3 and 4, a configuration is shown for a typical screw-in light bulb found commonly in the United States. Other configurations could likewise be used. In fact, the preferred embodiments expressly extend to a repeater with a first connection mechanism that is of a different type than the second connection mechanism, thereby allowing the repeater to be used as a lightbulb adapter as well as a repeater.

Figure 5:
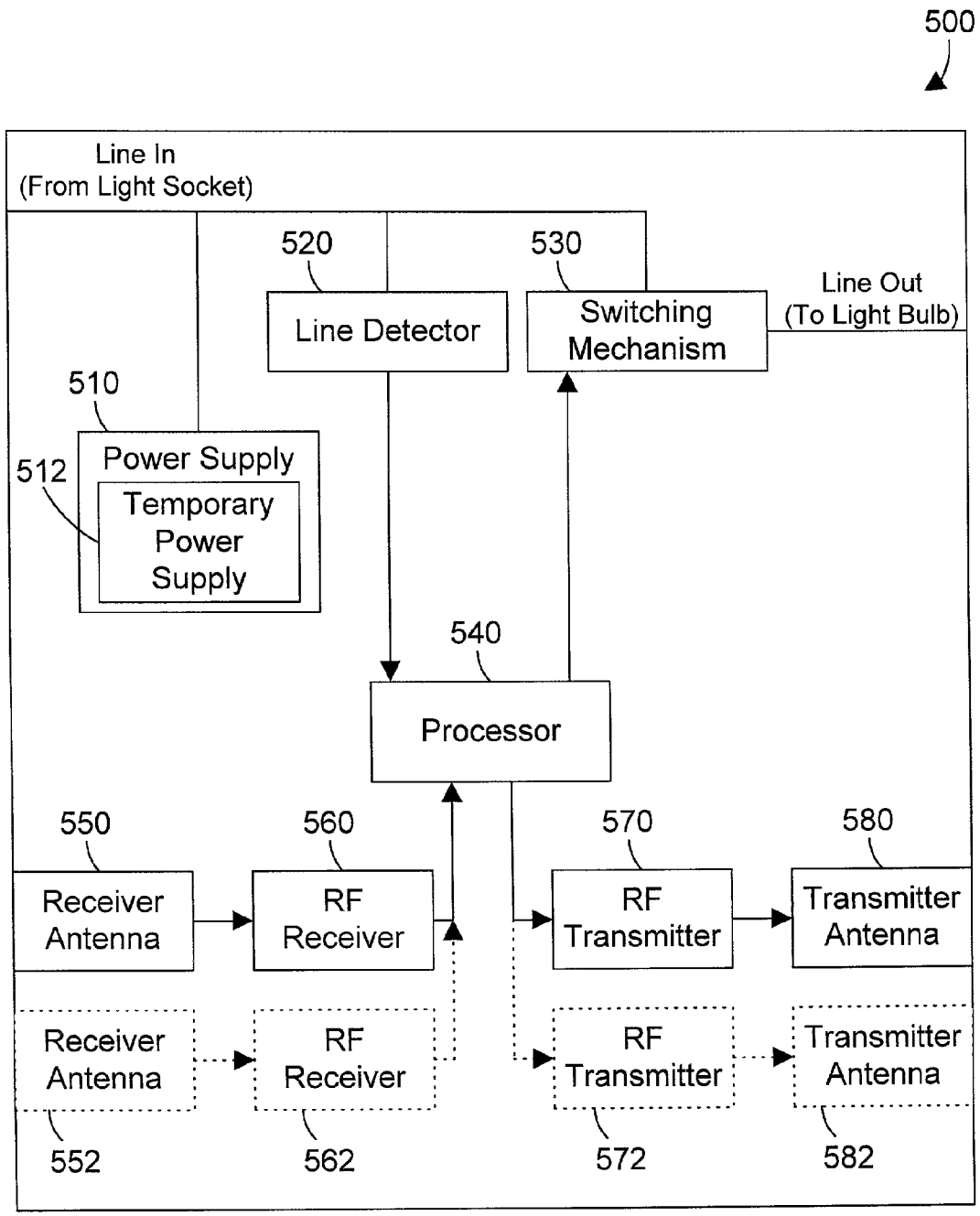
FIG. 5 is a schematic block diagram of the light socket wireless repeater and controller shown in FIGS. 3 and 4.

Housing 320 of FIGS. 3 and 4 includes control circuitry. One specific example of control circuitry in accordance with the preferred embodiments is shown in FIG. 5. Control circuitry 500 includes a power supply 510, a line detector 520, a switching mechanism 530, a processor 540, a receiver antenna 550, a radio frequency (RF) receiver 560, an RF transmitter 570 and a transmitter antenna 580. Note that the receiver antenna 550 and transmitter antenna 580 may be the same antenna, and that RF receiver 560 and RF transmitter 570 could be implemented within a single RF transceiver. Note also that additional RF receivers 562, RF transmitters 572, and antennas 552 and 582 (as shown in phantom in FIG. 5) could also be included to allow the device 200 to communicate with different types of wireless devices. This would allow, for example, repeating messages received in one protocol by one type of radio transceiver in a different protocol using a different type of radio transceiver. Thus, a Bluetooth message could be re-transmitted as an IEEE 802.11 message, and vice versa.

Power supply 510 preferably converts alternating current (AC) power from the Line In input from the light socket to direct current (DC) power that powers the line detector 520, switching mechanism 530, processor 540, RF receiver 560, and RF transmitter 570. Note that power supply 510 includes a temporary power supply 512 that supplies power to the circuit 500 when the Line In power from the light socket is turned off temporarily. This function is described in more detail below. Temporary power supply 512 could include one or more batteries, including rechargeable batteries that are automatically recharges when Line In power is present. However, the preferred implementation for temporary power supply 512 is one or more capacitors that are capable of powering circuit 500 for several seconds up to several hours.

Line detector 520 detects when line power is not present on the light socket, and signals any loss of line power to processor 540. Switching mechanism 530 is used to switch line power from the Line In input (from the light socket) to the Line Out output (to the light bulb). Processor 540 controls the operation of switching mechanism 530. RF receiver 560 receives RF messages via receiver antenna 550, and transmits received messages to processor 540. Processor 540 may transmit an RF message by writing a message to RF transmitter 570, which then transmits the message via transmitter antenna 580.

Processor 540 may be constructed from one or more microprocessors and/or integrated circuits. Processor 540 monitors messages received by RF receiver 560, and re-transmits these received messages at a predetermined power level via RF transmitter 570. This re-transmission of received messages is the repeating function of the wireless repeater and controller. As stated above in the Overview section, Bluetooth class 1 devices typically transmit in the 1 milliwatt (mW) to 100 mW range, resulting in a range up to 100 meters. Bluetooth class 2 devices typically transmit in the 250 microwatt (uW) to 2.5 mW range, resulting in a range up to ten meters. Bluetooth class 3 devices typically transmit less than 250 uW, resulting in a range up to 1 meter. Assuming that receiver antenna 550, RF receiver 560, RF transmitter 570, and transmitter antenna 580 are all part of a class 1 Bluetooth-compatible interface, the re-transmission will occur at the predetermined power level of 100 mW. Assuming that receiver antenna 550, RF receiver 560, RF transmitter 570, and transmitter antenna 580 are all part of a class 2 Bluetooth-compatible interface, the re-transmission will occur at the predetermined power level of 2.5 mW. Assuming that receiver antenna 550, RF receiver 560, RF transmitter 570, and transmitter antenna 580 are all part of a class 3 Bluetooth-compatible interface, the re-transmission will occur at the predetermined power level of 250 uW. These examples show that any transmission received by the repeater of the preferred embodiments is automatically boosted to the maximum signal strength for that type of interface. This maximum signal strength is one example of a suitable predetermined power level for re-transmitting messages.

The control function of the wireless repeater and controller is performed by the processor selectively enabling or disabling the switching mechanism 530 depending on different factors. When a wireless command is received via RF receiver 560 that indicates to turn on the light, processor 540 enables the switching mechanism 530 so that power is transferred from the Line In input to the Line Out output, thereby lighting the lightbulb. When a wireless command is received via RF receiver 560 that indicates to turn off the light, processor 540 disables the switching mechanism 530 so that power is disconnected between the Line In input and the Line Out output, thereby turning off the lightbulb. One suitable implementation for switching mechanism 530 is a relay.

Figure 6:
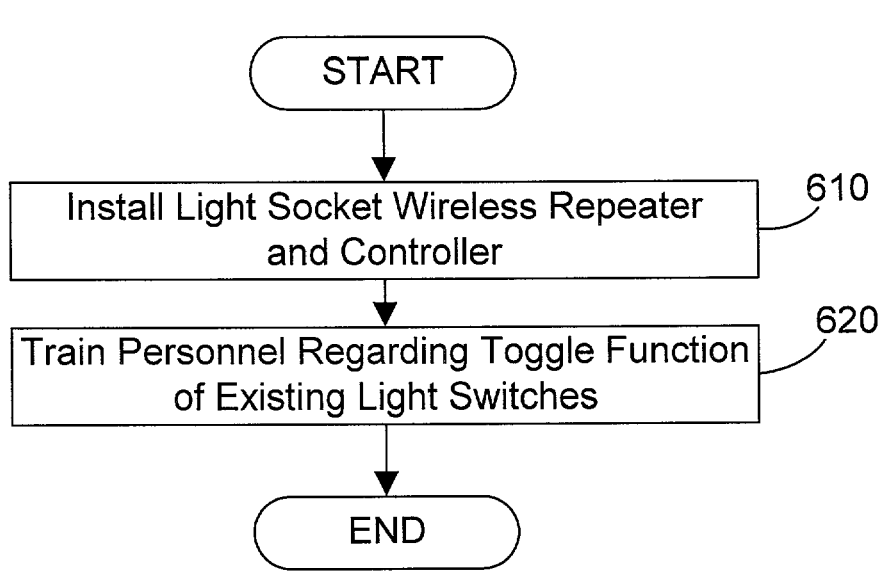
FIG. 6 is a flow diagram of a first method for installing and using the light socket wireless repeater and controller in accordance with the preferred embodiments.

Processor 540 may also control switching mechanism 530 depending on input received from the line detector 520. During normal operation, power supply 510 derives the power it supplies to the other components of circuit 500 from the power available on the Line In input. This means that the power to the light socket needs to be on in order for the circuit 500 to operate correctly in the long term. Placing the light socket wireless repeater and controller 200 into a light socket controlled by a wall switch thus presents a challenge because a person could turn the light switch off, thereby turning off power to the circuit 500. As a result, method 600 of FIG. 6 provides one way to account for this potential problem. The first step is to install the light socket wireless repeater and controller (step 610). Next, personnel must be trained to use the light switch in a different manner than they are accustomed (step 620). This training teaches the personnel to always leave a light switch in the "ON" position, so that line power is available to power the repeater 200. Turning the light switch from its on position to the off position, then back on, results in the line detector 520 detecting that power was switched off momentarily, and communicating this to processor 540. As a result, processor 540 changes the state of switching mechanism 530. This results in a toggle function each time the switch is turned momentarily off, then back on again. If the light is on and a person wants to turn the light off, they can do so by turning the light switch off for a short time (such as one second), then back on. Likewise, if the light is off and a person wants to turn the light on, they can do so by switching the light switch off then back on. This toggling function provided by line detector 520 and processor 540 allows a person to control the function of the light socket wireless repeater without changing any existing switches.

Figure 7:
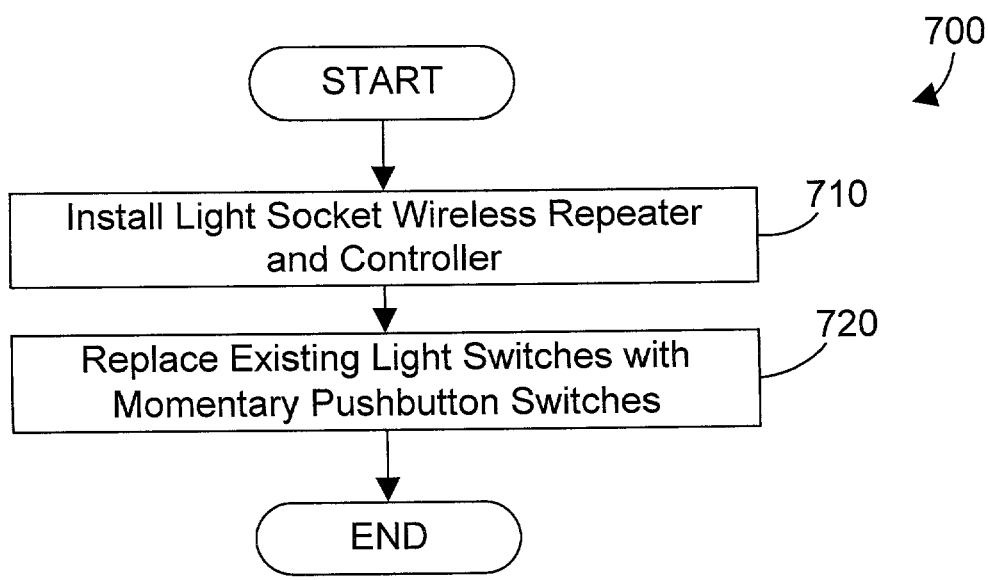
FIG. 7 is a flow diagram of a second method for installing and using the light socket wireless repeater and controller in accordance with the preferred embodiments.

An alternative way to control the turning on and off of the lightbulb is shown by method 700 of FIG. 7. First, the repeater is installed into the light socket (step 710). Next, an existing light switch that controls the light socket is replaced with momentary pushbutton switch (step 720). This momentary pushbutton switch is normally closed, and opens momentarily when the pushbutton is pushed. When the pushbutton is released, the momentary switch closes again. This system does not depend on a person remembering to leave the light switch on, but requires replacing a wall switch with a suitable pushbutton switch described above.

Yet another way to control the turning on and off of the lightbulb hard-wires power to the light socket in the electrical box that contains the switch, then replaces the switch with an RF transmitter switch that is capable of sending a wireless command to turn the light on and a wireless command to turn the light off to the light socket wireless repeater and controller. Such an RF transmitter switch could be powered by batteries, or could be powered by the line power available in the box.

Figure 8:
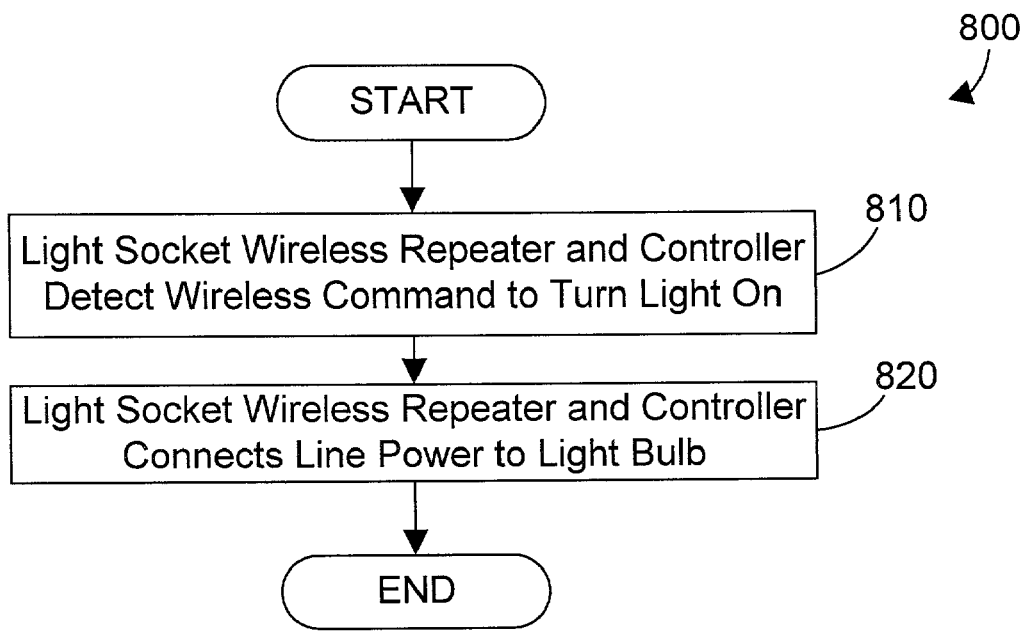
FIG. 8 is a flow diagram of a method for the light socket wireless repeater and controller to turn on the light bulb when a wireless command is received to turn on the light bulb.
Figure 9:
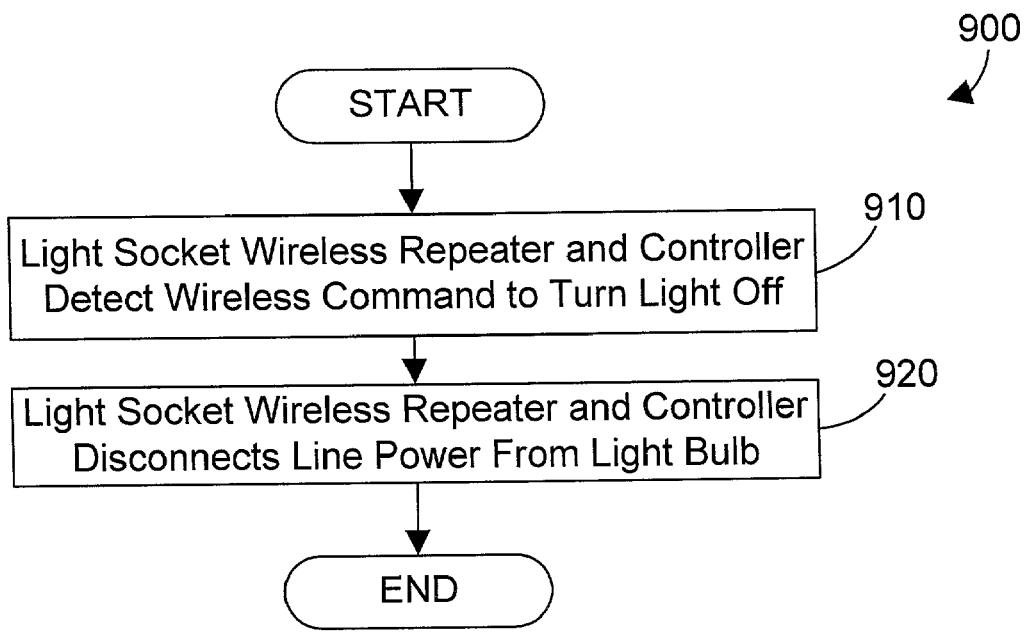
FIG. 9 is a flow diagram of a method for the light socket wireless repeater and controller to turn off the light bulb when a wireless command is received to turn off the light bulb.

One method 800 for controlling the function of a light bulb is shown in FIG. 8. This method assumes that the light socket wireless repeater and controller of the preferred embodiments has already been installed into a light socket, and a light bulb has been installed into the repeater. First, the repeater detects a wireless command to turn the light on (step 810). As a result, line power is connected to the light bulb (step 820). The light bulb may be turned off using method 900 of FIG. 9. First, the repeater detects a wireless command to turn the light off (step 910). As a result, line power is disconnected from the light bulb (step 920). In this manner, methods 800 and 900 may be used to remotely control a light that is connected to the light socket wireless repeater and controller.

Note that the apparatus and methods disclosed herein apply to any type of local wireless transmission protocol. Known examples include Bluetooth and IEEE 802.11, among others. However, the preferred embodiments expressly extend to any type of local wireless transmission protocol, whether currently known or developed in the future.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the examples provided herein specifically relate to alternating current light sockets and light bulbs, the preferred embodiments expressly extend to any and all power and light configurations. In addition, while the embodiments disclosed herein include a socket for a light bulb in the wireless repeater, the preferred embodiments expressly extend to a wireless repeater that is coupled to a light socket and that does not have a connection mechanism for a light bulb.

What is claimed is:

1. A wireless repeater comprising:
   a first connection mechanism that couples the wireless repeater to a light socket;

a second connection mechanism that couples the wireless repeater to a light bulb;

a switching mechanism coupled to the first connection mechanism controlling the application of power to the second connection mechanism; and a detector mechanism coupled to the first connection mechanism and to the switching mechanism, the detector mechanism sensing when power is removed from the first connection mechanism, and toggling the switching mechanism from an on state to an off state when power to the first connection mechanism is turned off and then turned on again, and then toggling the switching mechanism from an off state to an on state when power to the first connection mechanism is turned off and turned on again.

2. The wireless repeater of claim 1 further comprising a circuit comprising:

a first wireless receiver coupled to a first antenna;

a first wireless transmitter coupled to a second antenna; and a processor coupled to the first wireless receiver and the first wireless transmitter, the processor receiving a first wireless command via the first wireless receiver and repeating the first wireless command by transmitting the first wireless command via the first wireless transmitter.

3. The wireless repeater of claim 1 wherein the switching mechanism connects power from the first connection mechanism to the second connection mechanism when the first wireless receiver receives a first predetermined wireless command.

4. The wireless repeater of claim 1 wherein the switching mechanism disconnects power between the first connection mechanism and the second connection mechanism when the first wireless receiver receives a second predetermined wireless command.

5. The wireless repeater of claim 2 wherein the second antenna is the first antenna, and wherein the wireless receiver and the wireless transmitter are part of a wireless transceiver.

6. The wireless repeater of claim 2 further comprising a second wireless receiver and a second wireless transmitter coupled to a third antenna and coupled to the processor, the second wireless receiver and the second wireless transmitter receiving and transmitting, respectively, wireless messages using a second protocol that is different from a first protocol used by the first wireless receiver and the first wireless transmitter.

7. The wireless repeater of claim 6 wherein the processor receives a wireless message in the first protocol from the first wireless receiver, and transmits the wireless message in the second protocol via the second wireless transmitter.

8. The wireless repeater of claim 6 wherein the processor receives a wireless message in the second protocol from the second wireless receiver, and transmits the wireless message in the first protocol via the first wireless transmitter.

9. The wireless repeater of claim 2 wherein the circuit further comprises a power supply coupled to the first connection mechanism that supplies power to the first wireless receiver, the first wireless transmitter, and the processor.

10. The wireless repeater of claim 9 wherein the power supply comprises a temporary power supply for supplying stored energy when power is not available on the first connection mechanism.

11. The wireless repeater of claim 10 wherein the temporary power supply comprises at least one capacitor that supplies the stored energy.

12. The wireless repeater of claim 10 wherein the temporary power supply comprises at least one battery that supplies the stored energy.

13. A wireless repeater comprising:

a first connection mechanism that couples the wireless repeater to a light socket;

a second connection mechanism that couples the wireless repeater to a light bulb;

a circuit comprising:

a first wireless receiver coupled to a first antenna;

a first wireless transmitter coupled to the first antenna;

a processor coupled to the first wireless receiver and the first wireless transmitter, the processor receiving a first wireless command via the first wireless receiver and repeating the first wireless command by transmitting the first wireless command via the first wireless transmitter;

a switching mechanism coupled to the first connection mechanism and coupled to the processor, the switching mechanism controlling the application of power to the second connection mechanism, wherein the switching mechanism connects power from the first connection mechanism to the second connection mechanism when the first wireless receiver receives a first predetermined wireless command, and disconnects power between the first connection mechanism and the second connection mechanism when the first wireless receiver receives a second predetermined wireless command;

a power supply coupled to the first connection mechanism that supplies power to the first wireless receiver, the first wireless transmitter, and the processor, wherein the power supply comprises a temporary power supply for supplying stored energy when power is not available on the first connection mechanism; and a detector mechanism coupled to the first connection mechanism and to the switching mechanism, the detector mechanism sensing when power is removed from the first connection mechanism, and toggling the switching mechanism from an on state to an off state when power to the first connection mechanism is turned off and then turned on again, and then toggling the switching mechanism from an off state to an on state when power to the first connection mechanism is turned off and turned on again.

14. The wireless repeater of claim 13 further comprising a second wireless receiver and a second wireless transmitter coupled to a second antenna and coupled to the processor, the second wireless receiver and the second wireless transmitter receiving and transmitting, respectively, wireless messages using a second protocol that is different from a first protocol used by the first wireless receiver and the first wireless transmitter.

15. The wireless repeater of claim 14 wherein the processor receives a wireless message in the first protocol from the first wireless receiver, and transmits the wireless message in the second protocol via the second wireless transmitter.

16. The wireless repeater of claim 14 wherein the processor receives a wireless message in the second protocol from the second wireless receiver, and transmits the wireless message in the first protocol via the first wireless transmitter.

17. The wireless repeater of claim 13 wherein the temporary power supply comprises at least one capacitor that supplies the stored energy.

18. The wireless repeater of claim 13 wherein the temporary power supply comprises at least one battery that supplies the stored energy.

19. A method for controlling a lightbulb coupled to a wireless repeater comprising the steps of:
   turning on the lightbulb when a wireless repeater coupled to the lightbulb receives a first wireless command;
   turning off the lightbulb when the wireless repeater receives a second wireless command; and
   toggling the lightbulb from an on state to an off state when power to the wireless repeater is turned off and then turned on again, and then toggling the light bulb from an off state to an on state when power to the wireless repeater is turned off and turned on again.

20. The method of claim 19 further comprising the step of:
   training personnel to turn a light switch that controls application of power to the wireless repeater momentarily off then back on to toggle the state of the lightbulb.

21. The method of claim 19 further comprising the step of:
   installing at least one normally closed momentary open switch coupled to the wireless repeater that controls application of power to the wireless repeater.

22. The method of claim 19 further comprising the step of:
   providing temporary power to power the wireless repeater when main power is removed from the wireless repeater.

23. The method of claim 22 wherein the temporary power is provided by at least one capacitor in the wireless repeater.

24. The method of claim 22 wherein the temporary power is provided by at least one battery coupled to the wireless repeater.

25. A method for repeating a wireless message and for controlling the function of a lightbulb coupled to a wireless repeater, the method comprising the steps of:
   receiving the wireless message;
   transmitting the wireless message at a predetermined power level;
   receiving a first wireless command, and in response thereto, turning on the lightbulb;
   receiving a second wireless command, and in response thereto, turning off the lightbulb; and
   toggling the lightbulb from an on state to an off state when power to the wireless repeater is turned off and then turned on again, and then toggling the light bulb from an off state to an on state when power to the wireless repeater is turned off and turned on again.

26. The method of claim 25 further comprising the step of:
   training personnel to turn a light switch that controls application of power to the wireless repeater momentarily off then back on to toggle the state of the lightbulb.

27. The method of claim 25 further comprising the step of:
   installing at least one normally closed momentary open switch coupled to the light socket that controls application of power to the wireless repeater.

28. The method of claim 25 further comprising the step of:
   providing temporary power to power the wireless repeater when main power is removed from the wireless repeater.

29. The method of claim 28 wherein the temporary power is provided by at least one capacitor in the wireless repeater.

30. The method of claim 28 wherein the temporary power is provided by at least one battery coupled to the wireless repeater.

* * * * *